United States Patent [19]

Tanaka et al.

[11] Patent Number: 4,544,837
[45] Date of Patent: Oct. 1, 1985

[54] FOCUS SERVO CONTROL DEVICE FOR AN OPTICAL SYSTEM HAVING AN INITIAL FOCUS LOCKING OPERATION

[75] Inventors: Megumi Tanaka; Ryuichi Naito, both of Tokorozawa, Japan

[73] Assignee: Pioneer Electronic Corporation, Tokyo, Japan

[21] Appl. No.: 452,456

[22] Filed: Dec. 23, 1982

[30] Foreign Application Priority Data

Dec. 25, 1981 [JP] Japan .............................. 56-197695[U]

[51] Int. Cl.$^4$ ................................................. G11B 7/12
[52] U.S. Cl. ........................................ 250/201; 369/45
[58] Field of Search ................ 250/201 DF, 201, 204, 250/201 AF; 369/44–46, 111; 354/402–409; 356/4

[56] References Cited

U.S. PATENT DOCUMENTS

| 4,128,847 | 12/1978 | Roullet et al. | 369/45 |
| 4,280,215 | 7/1981 | Okano | 369/45 |
| 4,368,526 | 1/1983 | Harigae et al. | 369/45 |
| 4,446,546 | 5/1984 | Miller | 250/201 DF |

Primary Examiner—Edward P. Westin
Attorney, Agent, or Firm—Fleit, Jacobson, Cohn & Price

[57] ABSTRACT

A focus servo control device for an optical system having a focus servo loop including an objective lens movable between a nearest position and a farthest position relative to an object, and a focus error signal generator for producing a focus error signal including at least first and second in-focus signals, the first in-focus signal corresponding to a shorter one of two distance values between the objective lens and the object at which the first and second in-focus signals are generated and indicating a real in-focus state. The device is constructed to open the focus servo loop and move the objective lens from the farthest position to the nearest position, and then to move the objective lens from the nearest position to the farthest position, while monitoring the focus error signal, and closes the focus servo loop upon receipt of the first in-focus signal, thereby preventing a malfunction of the focus servo loop which might occur by locking the objective lens at a false in-focus position.

5 Claims, 8 Drawing Figures

FOCUS SERVO CONTROL DEVICE FOR AN OPTICAL SYSTEM HAVING AN INITIAL FOCUS LOCKING OPERATION

BACKGROUND OF THE INVENTION

1. Field of the Invention

The present invention relates to a focus servo control device for an optical system, and more specifically to a focus servo control device for an optical information reading system.

2. Description of Prior Art

Focus control is necessary in optical information reading systems in which information recorded on a recording medium is reproduced by using the reflection of a readout light beam applied on the surface of the recording medium. In order to accurately focus the readout light beam irrespective of rapid movement of the recording medium, such as a recording disc, it is general to use a focus servo loop system in which the position of an objective lens for receiving the reflection of the readout light beam is controlled in accordance with a focus error signal generated by an optical sensor means. Once the object lens is locked at an in-focus position, the position of the objective lens is automatically adjusted by the focus servo loop system so as to keep it in an in-focus state. However, at the beginning of the operation thereof, the focus servo loop system requires an initiation or a lead-in operation to search for the in-focus position. During the lead-in operation, the objective lens is, for example, moved gradually from a farthest position towards a nearest position relative to the recording surface of the recording medium. At the moment when an in-focus signal appears in the focus error signal, the focus servo loop system, which is initially set at an open loop state thereof, is immediately switched to a closed loop state in which the objective lens is automatically locked at the in focus position in accordance with the focus error signal.

In the prior art, however, the drawback is that the lead-in operation is not necessarily performed correctly in the event that a false or a spurious in-focus signal appears in the focus error signal. In other words, the focus servo loop system may be locked at a false in-focus position.

SUMMARY OF THE INVENTION

An object of the present invention is therefore to provide a focus servo control device for an optical system which can eliminate the above-mentioned malfunction of the focus servo loop system.

To this end, the present invention contemplates a focus servo control device for an optical system having a focus servo loop including an objective lens movable between a nearest point and a farthest point relative to an object, a focus error signal generator producing a focus error signal indicating at least first and second in-focus signals in relation to a relative distance of the objective lens and the object, the first in-focus signal corresponding to a shorter one of two distance values between the objective lens and the object at which the first and second in-focus signals are produced, indicating a real in-focus state, and a focusing device for positioning the objective lens in response to the focus error signal. The device includes a first means for opening the focus servo loop and positioning the objective lens at the nearest point, and a second means responsive to the focus error signal for moving the objective lens from the nearest point towards the farthest point and closing the focus loop upon receipt of the first in-focus signal.

The foregoing and other objects and advantages of the invention will become more clearly understood from the following description taken in conjunction with the accompanying drawings.

DETAILED DESCRIPTION OF PREFERRED EMBODIMENT

Figure 1:
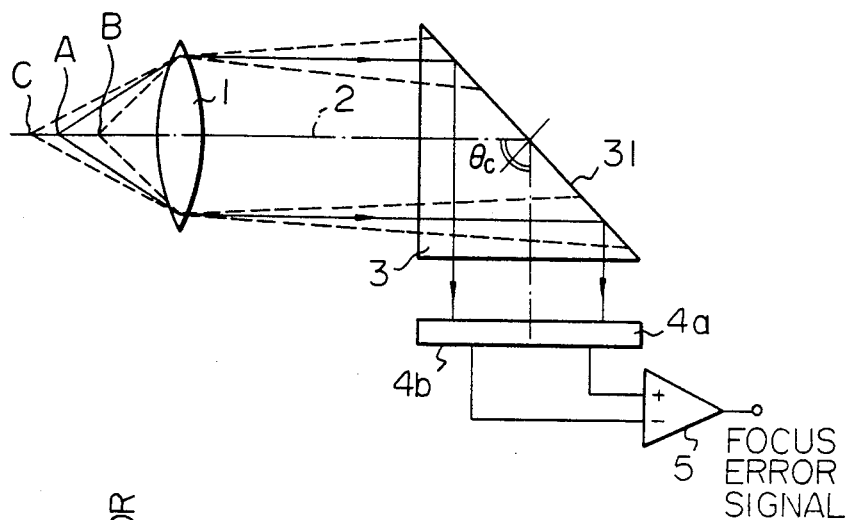
FIG. 1 is a diagram illustrating an example of a focus error signal generator.

Reference is first made to FIG. 1 which, as an example, schematically illustrates a focus error signal generator of a critical angle method which has been proposed recently. The critical angle method is, for example, described in a paper of the meeting of Japanese television association on Feb. 19, 1981, entitled "Optical head for a Digital Audio Disc (DAD) System", incorporated herein by reference.

As shown, a prism 3 is placed at a position on an optical axis of an objective lens 1 in a manner that the angle of incidence of objective light from the object lens 1 is equal to a critical angle $\theta c$ of the prism 3.

Coupled photo detectors 4a and 4b are disposed to face a surface of the prism 3 so as to receive the light from a reflection surface 31 of the prism 3. Output signals of the photo detectors 4a and 4b are applied to a positive and a negative input terminals of a differential amplifier 5. The differential amplifier 5 generates a signal based upon the difference of the output signals of the photo detectors 4a and 4b in order to produce a focus error signal at an output terminal thereof.

In this arrangement, if a recording surface of a recording medium such as an optical recording disc is in focus, in other words, at a focal point A of the objective lens 1, a light beam passing from the objective lens 1 to the prism 3 will take the form of a parallel beam of light rays as shown by solid lines in FIG. 1. In this state, the photo detectors 4a and 4b receive the same quantity of light from the prism 3. Therefore, the differential amplifier 5 produces a focus error signal of 0 volts, i.e., an in-focus signal.

On the other hand, if the recording surface comes to such a position closer to the objective lens 1 as a position B of FIG. 1, the light beam from the objective lens 1 to the prism 3 will be a divergent beam light rays as shown by the outer pair of the dashed lines of FIG. 1. In this state, the photo detector 4b receives a smaller quantity of light than the photo detector 4a. Therefore, the differential amplifier 5 produces a focus error signal of a positive polarity. Furthermore, if the recording surface is at such a position slightly away from the focal point A of the objective lens 1 as the point C of FIG. 1, the light beam from the objective lens 1 to the prism 3 will be a convergent beam of light rays as shown by the inner pair of the dashed lines of FIG. 1. In this state, the photo detector 4b receives a greater quantity of light than the photo detector 4a. Consequently, the differential amplifier 5 produces a focus error signal of negative polarity.

Figure 2:
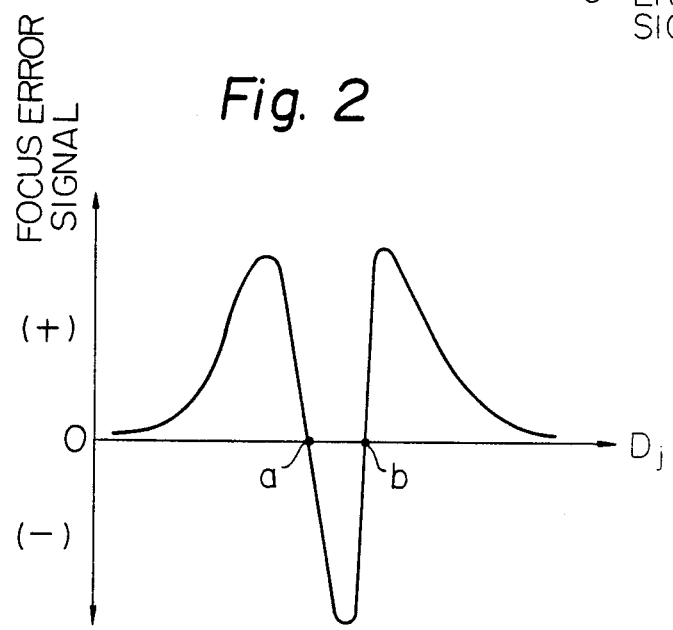
FIG. 2 is a waveform diagram of a focus error signal generated by the focus error signal generator of FIG. 1.

FIG. 2 shows the variation of the level of the focus error signal produced the differential amplifier 5 of FIG. 1 in relation to a distance Dj of the recording surface and the objective lens 1. As shown, the voltage level of the focus error signal is zero (0) at a point which is the real in-focus position. However, there is another point b in which the voltage level of the focus error signal is zero (0) on the side of longer distance Dj. This point b is not the real in-focus point, that is, an out of focus point and as previously mentioned, it will cause a malfunction of the optical system if the objective lens 1 is locked at the point B by the operation of the focus servo loop.

Figure 3:
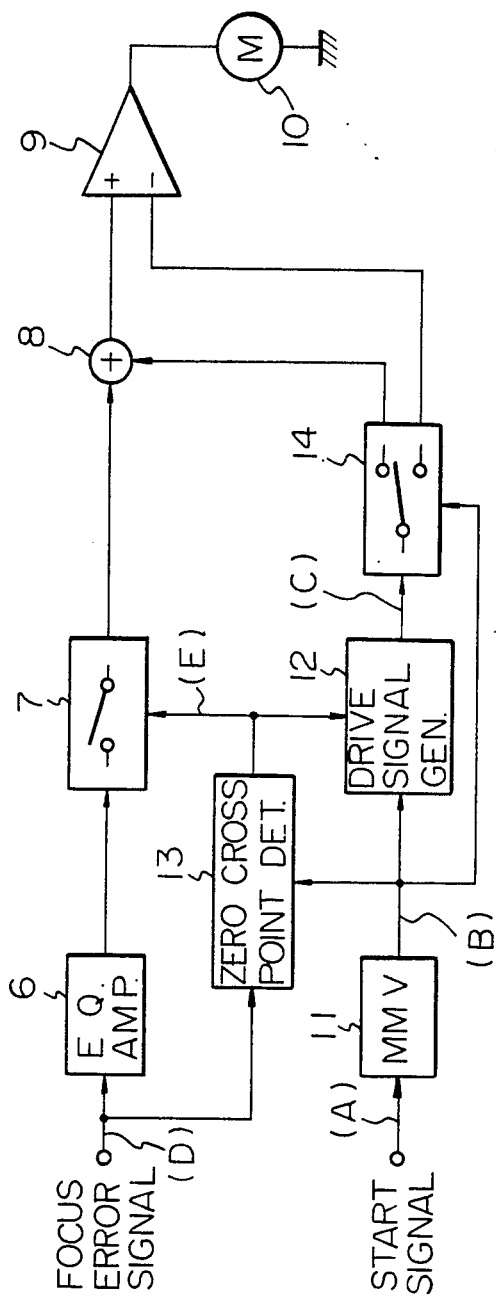
FIG. 3 is a block diagram of an embodiment of a focus servo control device in accordance with the present invention.

Turning to FIG. 3, an embodiment of the focus servo control device in accordance with the present invention will be explained hereinafter. As shown, the device comprises an equalizer amplifier 6 which receives a focus error signal such as the signal produced by the focus error signal generator shown in FIG. 1. After compensation of frequency and phase characteristics in the equalizer amplifier 6, the signal is applied to an adder 8 via a servo loop control switch 7. The switching operation of the servo loop control switch 7 is subject to the operation of the other parts of the device which will be described hereinafter. A start signal A which has a high level during the operational period of the focus servo system is applied to a monostable multivibrator 11. An output pulse signal B of the monostable multivibrator 11 is applied to a zero (0) cross point detector 13, which also receives a focus error signal. The output signal B is further applied to a drive signal generator 12 for producing a drive control signal C, and to a polarity change-over switch 14. An output signal of the zero cross point detector 13 is applied to the servo loop control switch 7 and the drive signal generator 12. More specifically, when the voltage level of the focus error signal is zero (0) the zero cross point detector 13 produces an output signal which closes the servo loop control switch, which is initially opened. At the same time, the drive signal generator 12 is reset by the output signal of the zero cross point detector 13. However, the operation of the zero cross point detector 13 is suspended during the time an output pulse signal of the monostable multivibrator 11 is applied thereto. The drive control signal C of the drive signal generator 12 varies as follows. When the output pulse signal B of the monostable multivibrator is present, the voltage level of the drive control signal gradually increases from zero up to a predetermined highest limit level. After the period of the output pulse signal B of the monostable multivibrator 11, the drive control signal C gradually decreases from the highest limit level until the reset signal is applied from the zero cross point detector 13 to the drive signal generator 12. The polarity change-over switch 14 has a movable contact connected to the drive signal generator 12 and first and second fixed contacts connected to the adder 8 and to a negative input terminal of a drive amplifier 9 respectively. When the output pulse signal B of the monostable multivibrator 11 is present, the movable contact of the polarity change-over switch is positioned at the first fixed contact. A positive input terminal of the drive amplifier 9 is connected to the adder 8 and an output signal thereof is supplied to an objective lens drive motor 10.

Figure 4A:
FIGS. 4A through 4E are waveform diagrams of signals at various points of the focus servo control device of FIG. 3.
Figure 4B:

The operation of the device will be explained with reference to the waveform diagrams FIGS. 4A through 4E. As shown in FIGS. 4A and 4B, the monostable multivibrator 11 produces output pulse signal B having a time duration To upon receipt of the high level start signal A. During the time period To, the increasing drive control signal C shown in FIG. 4C produced by the drive signal generator 12 is applied to the positive input terminal of the drive amplifier 9 via the first fixed terminal of the polarity change-over switch 14 and the adder 8. In this state, the servo loop control switch 7 is open and therefore the objective lens drive motor 10 is controlled by the drive control signal C in order to move the object lens towards a nearest position relative to the surface of the recording medium. The focus error signal D as the consequence of the movement of the object lens is shown in FIG. 4D.

Figure 4C:
Figure 4D:
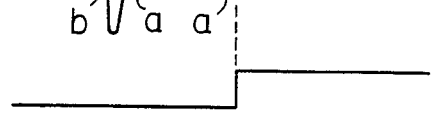
Figure 4E:

After the time period $T_o$ shown in FIG. 4B, the zero cross point detector 13 is activated and the decreasing drive control signal C shown in FIG. 4C is applied to the negative input terminal of the drive amplifier 9 through the second fixed terminal of the polarity change-over switch 14. Therefore the objective lens drive motor 10 is driven in the opposite direction so as to move the objective lens from the nearest position towards the farthest position. During this movement of the objective lens, the focus error signal D is applied to the zero cross point detector 13. When the zero cross point detector 13 detects the first occurrence of the zero (0) level of the focus error signal D in this state, in other words when the object lens is positioned at the real in-focus position which is closer to the recording surface, the servo loop control switch 7 is immediately closed to transmit the focus error signal D to the drive amplifier 9, via the adder 8, by the output signal E (shown in FIG. 4E) of the zero cross point detector 13. The voltage level of the drive control signal C is reduced to zero at the same time (FIG. 4C). In this way, the lead-in of the focus servo loop is performed and the objective lens is locked in the real in-focus position.

It is to be understood that the time period $T_o$ should be longer than the time period from the leading edge of the start signal A to the in-focus signal corresponding to the real in-focus state of the objective lens with respect to the object.

It will be appreciated from the foregoing, malfunction of the focus servo loop system is eliminated by a device having a relatively simple arrangement.

Furthermore, the drive signal generator 12 may take the form of a constant current charge and discharge circuit utilizing a capacitor.

Above, a preferred embodiment of the present invention has been described. It should be understood, however, that the foregoing description has been for illustrative purpose only, and is not intended to limit the scope of the invention. Rather, there are numerous equivalents to the preferred embodiment, and such are intended to be covered by the appended claims. As an example, the device can be used with various optical systems such as a video disc player system and a digital audio disc (DAD) player system.

What is claimed is:

1. A focus servo control device for an optical system having a focus servo loop including (i) an objective lens movable between a nearest position and a farthest position relative to an object, (ii) a focus error signal generator for producing a focus error signal including at least first and second in-focus signals in relation to a relative distance between the objective lens and the object, said first in-focus signal being produced when said relative distance is substantially at a first value and indicating a real in-focus state, said second in-focus signal being produced when said relative distance is substantially at a second value greater than said first value, and corresponding to an out of focus state, and (iii) a focusing device for positioning the objective lens in response to the focus error signal, the focus servo control device comprising:

a first means for opening the focus servo loop and for positioning said objective lens at said farthest position; and a second means responsive to the focus error signal for moving the objective lens from the farthest position towards the nearest position, and for subsequently moving said objective lens from the nearest position towards the farthest position and closing the focus servo loop upon receipt of the first in-focus signal without respect to said second in-focus signal while said objective lens is moved from said nearest position toward said farthest position.

2. A focus servo control device for an optical system having a focus servo loop including (i) an objective lens movable between a nearest position and a farthest position relative to an object, (ii) a focus error signal generator for producing a focus error signal including at least a first and a second in-focus signal in relation to a relative distance of the objective lens and the object, the first in-focus signal being produced when said relative distance is substantially at a first value and indicating a real in-focus state, said second in-focus signal being produced when said relative distance is substantially at a second value greater than said first value, (iii) and a focusing device for positioning the objective lens in response to the focus error signal, the focus servo control device comprising:

(1) a start signal generator for generating a start signal for initiating the operation of the focus servo loop;

(2) a timer means responsive to said start signal for producing a timer pulse signal having a predetermined time duration;

(3) an in-focus signal detector means responsive to said focus error signal and said timer pulse signal for producing a locking signal upon detection of said in-focus signal of said focus error signal, said in-focus signal detector means being inhibited from producing said locking signal upon the presence of said timer pulse signal;

(4) a focus loop control switch means responsive to said locking signal for transmitting said focus error signal to said focusing device upon the absence of said locking signal; and (5) a drive control signal generator means responsive to said timer pulse signal and said locking signal for producing a first drive control signal for moving said objective lens from said farthest position to said nearest position relative to the object upon the presence of said timer pulse signal and for producing a second drive control signal for moving said objective lens gradually away from said nearest position relative to the object after extinction of said timer pulse signal, and under a condition that said locking signal is not present.

3. The focus servo control device of claim 2, wherein said predetermined time duration is longer than the time period of from said start signal to the initial one of said in-focus signals.

4. The focus servo control device of claim 2, wherein said first and second in-focus signals of said focus error signal take the form of a zero (0) level signal, and wherein said in-focus signal detector means comprises a zero level detector circuit.

5. The focus servo control device of claim 2, wherein said timer means comprises a monostable multivibrator triggerable by said start signal.

* * * * *